US012572791B2

(12) United States Patent
Zela et al.

(10) Patent No.: US 12,572,791 B2
(45) Date of Patent: Mar. 10, 2026

(54) METHOD, DEVICE AND COMPUTER PROGRAM FOR PREDICTING A SUITABLE CONFIGURATION OF A MACHINE LEARNING SYSTEM FOR A TRAINING DATA SET

(71) Applicant: Robert Bosch GmbH, Stuttgart (DE)

(72) Inventors: Arber Zela, Bad Krotzingen (DE); Frank Hutter, Freiburg (DE); Julien Siems, Freiburg (DE); Lucas Zimmer, Lörrach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1455 days.

(21) Appl. No.: 16/950,570

(22) Filed: Nov. 17, 2020

(65) Prior Publication Data

US 2021/0264256 A1     Aug. 26, 2021

(30) Foreign Application Priority Data

Feb. 25, 2020     (DE) .......................... 202020101012.3

(51) Int. Cl.
  *G06N 3/08*        (2023.01)
  *G06F 18/20*       (2023.01)
          (Continued)

(52) U.S. Cl.
  CPC ............. *G06N 3/08* (2013.01); *G06F 18/217* (2023.01); *G06F 18/29* (2023.01); *G06N 20/20* (2019.01); *G06V 10/454* (2022.01); *G06V 10/764* (2022.01)

(58) Field of Classification Search
  CPC .......... G06N 3/08; G06N 20/20; G06N 3/042; G06N 3/045; G06N 3/008; G06N 20/00;
          (Continued)

(56) References Cited

U.S. PATENT DOCUMENTS

2019/0370684 A1* 12/2019 Gunes ................... G06N 20/00

FOREIGN PATENT DOCUMENTS

DE        102019207911 A1     12/2020

OTHER PUBLICATIONS

Karpenko, Mark & Anderson, John & Sepehri, Nariman. (2006). Coordination of hydraulic manipulators by reinforcement learning. Proceedings of the American Control Conference. 2006. 6 pp . . . 10.1109/ACC.2006.1657214. (Year: 2006).*

(Continued)

*Primary Examiner* — Luis A Sitiriche
(74) *Attorney, Agent, or Firm* — NORTON ROSE FULBRIGHT US LLP

(57)     ABSTRACT

A method for predicting a suitable configuration of a machine learning system for a first training data set. The method starts by training a plurality of machine learning systems on the first training data set, the machine learning systems and/or the training methods used being configured differently. This is followed by a creation of a second training data set including ascertained performances of the trained machine learning systems and the assigned configuration of the particular machine learning systems and/or training methods. This is followed by a training of a graph isomorphism network, depending on the second training data set, and a prediction in each case of the performance of a plurality of configurations not used for the training, with the aid of the GIN. A computer program and a device for carrying out the method and a machine-readable memory element, on which the computer program is stored, are also described.

7 Claims, 9 Drawing Sheets

(51) Int. Cl.
| | |
|---|---|
| G06F 18/21 | (2023.01) |
| G06N 20/20 | (2019.01) |
| G06V 10/44 | (2022.01) |
| G06V 10/764 | (2022.01) |

(58) Field of Classification Search
CPC ......... G06N 3/04; G06F 18/217; G06F 18/29; G06V 10/454; G06V 10/764
See application file for complete search history.

(56) References Cited

OTHER PUBLICATIONS

Y. Li, H Li, F. Pickard IV, B. Narayanan, F. Sen, M. Chan, S. Sankaranarayanan, B. Brooks, and B. Roux. (2017) Machine Learning Force Field Parameters from Ab Initio Data. Journal of Chemical Theory and Computation 2017 13 (9), 4492-4503 (Year: 2017).*

Yiming Yang. 2018. Large-scale Machine Learning over Graphs. In Proceedings of the 2018 ACM SIGIR International Conference on Theory of Information Retrieval (ICTIR '18). Association for Computing Machinery, New York, NY, USA, 9. https://doi.org/10.1145/3234944.3240462 (Year: 2018).*

Noutahi, Emmanuel & Beaini, Dominique & Horwood, Julien & Tossou, Prudencio. (2020). Towards interpretable molecular graph representation learning. (Year: 2020).*

L. Lopez, M. Guynn and M. Lu, "Predicting Computer Performance Based on Hardware Configuration Using Multiple Neural Networks," 2018 17th IEEE International Conference on Machine Learning and Applications (ICMLA), Orlando, FL, USA, 2018, pp. 824-827, doi: 10.1109/ICMLA.2018.00132. (Year: 2018).*

Xu et al., "How Powerful Are Graph Neural Networks?," in International Conference on Learning Representations, 2019, pp. 1-17. <https://openreview.net/forum?id=rygs6ia5km> Downloaded on Nov. 17, 2020.

Liu et al., "DARTS: Differentiable Architecture Search," Cornell University Online Library, 2019, pp. 1-13. <https://arxiv.org/abs/1806.09055v2> Downloaded on Nov. 17, 2020.

Jamieson et al., "A Non-Stochastic Best Arm Identification and Hyperparameter Optimization," in Proceedings of the Seventeenth International Conference on Artificial Intelligence and Statistics (AISTATS), Cornell University Online Library, 2015, pp. 1-13. <https://arxiv.org/abs/1502.07943v1> Downloaded on Nov. 17, 2020.

Ying et al., "Hierarchical Graph Representation Learning With Differentiable Pooling," in Proceedings of the 32nd International Conference on Neural Information Processing Systems, 2018, pp. 1-11. Downloaded on Nov. 17, 2020.

Chen et al., "Xgboost: a Scalable Tree Boosting System," Cornell University Online Library, 2016, pp. 1-13. <https://arxiv.org/abs/1603.02754v3>. Downloaded on Nov. 17, 2020.

Ke et al., " Lightgbm: A Highly Efficient Gradient Boosting Decision Tree," in Proceedings of the 31st International Conference on Neural Information Processing Systems, 2017, pp. 1-9. <https://papers.nips.cc/paper/6907-lightgbm-a-highly-efficient-gradient-boosting-decision-tree.pdf> Downloaded on Nov. 17, 2020.

* cited by examiner

METHOD, DEVICE AND COMPUTER PROGRAM FOR PREDICTING A SUITABLE CONFIGURATION OF A MACHINE LEARNING SYSTEM FOR A TRAINING DATA SET

CROSS REFERENCE

The present application claims the benefit under 35 U.S.C. § 119 of German Patent Application No. DE 202020101012.3 filed on Feb. 25, 2020, which is expressly incorporated herein by reference in its entirety.

FIELD

The present invention relates to a method for predicting a suitable configuration of a machine learning system and/or a training method for a training data set with the aid of a graphical neural network. The present invention likewise relates to a device and a computer program, which are each configured to carry out the method.

BACKGROUND INFORMATION

German Patent Application No. DE 10 2019 207 911.3 describes a method for predicting a learning curve of an iterative training method for machine learning systems.

SUMMARY

Prior to the actual training of a machine learning system, a suitable configuration, ideally an optimal configuration, of the machine learning system must be selected, so that the machine learning system achieves a best possible performance on the training data as well as on the test or validation data. However, finding such a suitable configuration ahead of time is extremely complex, since the search space for this purpose may offer an extremely large number of different combinations (up to $10^{23}$), which may not be possible to locate within a foreseeable period of time using standard optimization methods, in particular due to discrete properties of the search space.

An object of the present invention is to find the optimal configuration with little complexity, based on which a machine learning system may then be initialized and trained. This has the advantage that the machine learning systems thus found and trained, which may then be used, for example, as classifiers, may be particularly effectively adapted to the training data and are ultimately particularly powerful.

With the aid of the described method, it is possible for the first time to be able to handle a search space, which is at least $10^{18}$ times larger than all previously used search spaces. It will thus also be possible for the first time to handle a joint search space containing all joint architecture and hyperparameter spaces. This makes it possible to find even superior configurations, since the two aforementioned parameter types may be dependent on each other.

SUMMARY

In a first aspect of the present invention, a method is described for predicting a suitable configuration of a machine learning system for a first training data set. A configuration may be understood to be architecture parameters of the machine learning system and/or hyperparameters of a training method for the machine learning system. The architecture parameters are parameters which characterize a design or a structure of the machine learning system, for example a number of layers. Hyperparameters are parameters which characterize a training method, in particular optimization methods, for training the machine learning system. A hyperparameter may be, for example, a learning rate. The machine learning system may be an artificial neural network. Alternatively, the machine learning system may be a DARTS cell model of the artificial neural network.

A suitable configuration may be understood to be that the machine learning system, which was configured with the aid of this configuration, may represent the information in the training data set preferably comprehensively and with a preferably simple architecture, and/or that a training method has a good convergence behavior for the training data set with the aid of this configuration.

In accordance with an example embodiment of the present invention, the method includes the following steps, which are carried out on a programmable data processing system, such as a computer. The method starts by training a plurality of machine learning systems on the first training data set, the machine learning systems and/or a training method used being configured differently. It should be noted that the training may be a complete training, in which the machine learning systems continue to be trained until a convergence criterion is met, for example a slope of a learning curve is no longer greater than a threshold value, or the performance or an accuracy is no longer improved. However, it is also possible that the system is only partially trained as long as the slope of the learning curve is greater than a threshold value.

A training data set is hereinafter understood to be a data set which includes training input variables and assigned labels, the labels characterizing their assigned training input variables in each case. Training input variables of the first training data set may be arbitrary sensor data, preferably images. Training input variables of the second training data set are the configurations.

This is followed by a creation of a second training data set D, including ascertained performance capabilities of the trained machine learning systems on the first training data set and the assigned configuration of the particular machine learning systems and/or the training method.

A performance capability may be understood to be a performance of the machine learning system on the first training data set. The performance characterizes, for example, how accurately the training output variables may be recreated with the aid of the trained machine learning systems, depending on the training input variables, for example a training/testing/validation accuracy. It is also possible that the performance capability characterizes a total training time, a number of model parameters and/or a training/testing/validation accuracy of a "learning curve." The learning curve describes a training profile over time, at which the performance of the machine learning system is plotted on an axis along a completed time for the training.

This is followed by a training of a graph isomorphism network (GIN), depending on the second training data set D, so that the GIN ascertains the associated performance, depending on the configurations. The GIN is described in the publication by the authors XU et al., "How Powerful are Graph Neural Networks?" in International Conference on Learning Representations, 2019 https://openreview.net/forum?id=ryGs6iA5 Km.

This is followed by a prediction of the performance of a plurality of configurations not used, in particular for the training, with the aid of the GIN. This is followed by a selection of the predicted configuration, for which the best performance was predicted.

In accordance with an example embodiment of the present invention, a new machine learning system is initialized, which is then optimized for the first and/or a further data set, depending on the selected configuration.

Experiments have shown that a very high correlation between testing and validation errors is achieved with the aid of the described method (Spearman corr. coeff. 0.995). In other words, the GIN is able to achieve a good generalization. The same applies to the training and validation error. This permits a high quality prediction of the GIN, using relatively few training data. Consequently, the search space may be explored in a very sample-efficient manner and subsequently predicted particularly precisely.

The advantage of the targeted use of GIN is that comparison experiments using other models have shown that GIN, in particular, may especially effectively learn and also predict the correlations of the configurations and the performance of the machine learning system with the particular configuration. A particularly good interpolation and extrapolation property is achieved thereby. This explains the aforementioned advantage of the good generalization with a small amount of training data.

It is further provided that the configurations include at least one parameter, which characterizes a structure of the machine learning system, the machine learning system being designed or defined or characterized with the aid of DARTS cells. The advantage here is that this method also makes it possible to avoid sub-optimal architectures, which may be disadvantageously found by DARTS. In other words, with the aid of the described configuration, DARTS is initialized by the method of the first aspect of the present invention in such a way that it is more robust with respect to local optimums and may not converge to sub-optimal architectures. DARTS is an architecture search method by the authors Liu et al. titled "Differentiable Architecture Search," downloadable online: https://arxiv.org/abs/1806.09055.

It is furthermore provided that the parameters which characterize the structure of the machine learning system for different DARTS cells, in particular for the normal cell and the reduction cell, are grouped into disjoint graphs for the second training data set, further parameters of the configurations which characterize a predefinable number of total stacked cells c and/or a predefinable number of training epochs e, are concatenated for each DARTS cell of the machine learning system.

It is furthermore provided that further configurations are ascertained with the aid of a successive halving method, depending on a predefinable computational budget, until the highest values of a predefinable set of values have been reached by further parameters of the configurations. The successive halving method was described by the authors Jamieson et al., "A Non-stochastic best arm identification and hyperparameter optimization," in Proceedings of the Seventeenth International Conference on Artificial Intelligence and Statistics (AISTATS), 2016, downloadable online: https://arxiv.org/abs/1502.07943.

An advantage of the use of the successive halving method is a balanced time budget distribution for the simpler and more complex configurations, and also a focusing on what tend to be the more important regions in the search space, whereby the GIN becomes more precise for the more relevant configurations.

In accordance with an example embodiment of the present invention, it is furthermore provided that, during the training, multiple different further configurations are randomly used in addition for the lowest values of the predefinable set of values. The values of the value range are preferably a multiple of the lowest value (multiplied by a predefinable factor) and are also used for training the machine learning system. The advantage here is a more accurate sampling of the search space and a mapping of extreme cases of the configurations.

It is furthermore provided that a differentiable graph pooling network (DiffPool) or XGBoost or LGBoost is used instead of the GIN. Comparison experiments have shown that XGBoost and LGBoost have the advantage that they learn quickly on the data but achieve a less effective generalization, compared to GIN. In addition, it has been discovered that DiffPool is an equivalent alternative to GIN.

DiffPool was described by the authors Ying et al., "Hierarchical graph representation learning with differentiable pooling," in Proceedings of the 32nd International Conference on Neural Information Processing Systems, NIPS '18, pp. 4805-4815, Red Hook, NY, USA, 2018. Curran Associates Inc. https://papers.nips.cc/paper/7729-hierarchical-graph-representation-learning-with-differentiable-pooling. XGBoost was described by the authors Chen et al., "XGBoost: A scalable tree boosting system," downloadable online: https://arxiv.org/abs/1603.02754. LGBoost was described by the authors Ke et al., "A highly efficient gradient boosting decision tree," downloadable online: https://papers.nips.cc/paper/6907-lightgbm-a-highly-efficient-gradient-boosting-decision-tree.pdf.

The new, configured machine learning system, which was configured with the aid of the selected configuration and then optimized on the first and/or a further data set, may be used in a physical/technical system, e.g., a robot or an at least semi-autonomous vehicle, which includes an actuator. The ascertained output variable of the optimized machine learning system may be used by a control unit, so that the control unit controls the actuator, depending on this output variable. For this purpose, the control unit may determine a control variable, depending on the ascertained output variable, and use it to control the actuator.

Alternatively, the control variable, which may be used to control an actuator of a technical system, may be ascertained depending on the ascertained output variable of the optimized machine learning system. The control of the actuator may take place according to the control variable. The technical system may be, for example, an at least semi-autonomous machine, an at least semi-autonomous vehicle, a robot, a tool, a work machine or a flying object such as a drone. For example, a movement of the robot or vehicle may be controlled, or a control of the actuator may take place.

The provided input variable of the optimized machine learning system may be ascertained, for example, depending on detected sensor data and provided thereto. The sensor data may be detected by a sensor, such as a camera, of the technical system, or alternatively be received externally.

The machine learning systems are preferably classifiers, which are configured to assign their input variable to a class made up of a plurality of classes.

In another aspect of the present invention, a computer program is described. The computer program is configured to carry out one of the aforementioned methods. The computer program includes instructions, which prompt a computer to carry out one of these mentioned methods, including all its steps, when the computer program runs on the computer. A machine-readable memory module is further described, on which the computer program is stored. Moreover, a device is described, which is configured to carry out one of the methods.

Exemplary embodiments of the aforementioned aspects are illustrated in the figures and explained in greater detail in the description below.

DETAILED DESCRIPTION OF EXAMPLE EMBODIMENTS

Figure 1:
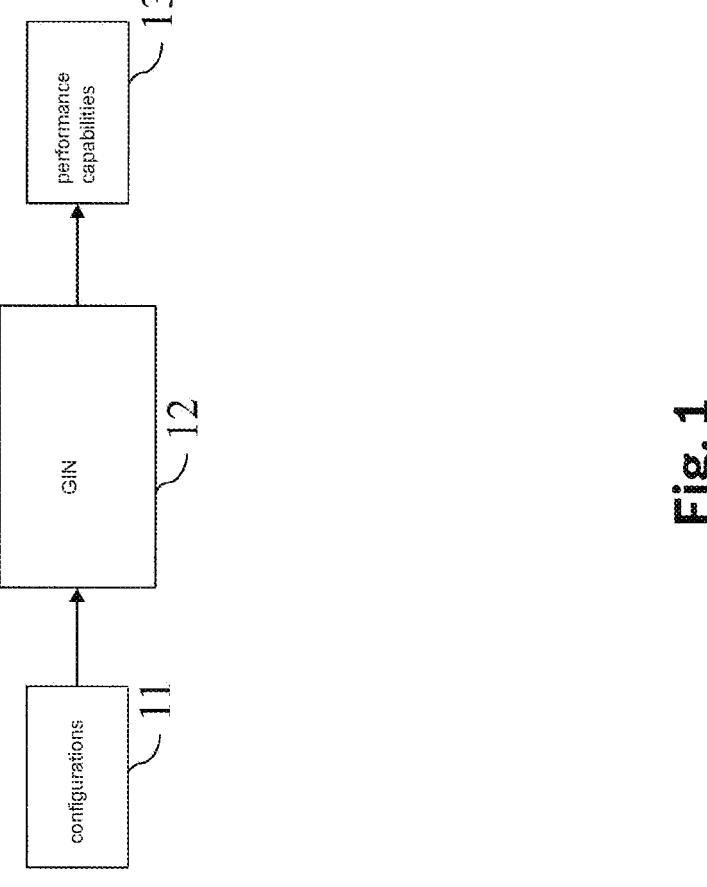
FIG. 1 shows a schematic representation of a machine learning system, in accordance with an example embodiment of the present invention.

FIG. 1 shows a schematic representation of a graph isomorphism network (GIN) 12. GIN 12 receives as input variable configurations 11 of a machine learning system and/or configurations 11 of a training method, which is used for training the machine learning system. GIN 12 processes these configurations 11 to an output variable (e.g., preference capability(ies) 13), which in this exemplary embodiment characterizes a performance and/or runtime of the machine learning system.

A search space which includes all possible configurations 11 is to be explained in greater detail below. Search space $\Delta:=A \times \Lambda \times \Theta$ includes:

a cell-structured architecture space A, as used in DARTS, including:

a normal cell, which is characterized in that it retains a spatial resolution of its input variable, a reduction cell, which is characterized in that it reduces the spatial resolution of its input variable by a predefinable factor, and/or a training hyperparameter space $\Lambda$, which contains, for example, the following parameters:

a learning rate $\eta$, which is preferably derived from a log-normal distribution Log N(0:025; 0:0252), which is cut off between $10^{-4}$ and 1, a weight decay $\gamma$, which is preferably derived from a log-normal distribution Log N(0:0003; 0:00032) and is cut off between $3 \cdot 10^{-5}$ and $3 \cdot 10^{-1}$, and/or a further parameter space $\Theta$, which contains, for example, the following parameters:

a predefinable number of convolution channels ch a predefinable number of total stacked cells c a predefinable number of training epochs e.

The term "configuration" is intended to describe a combination $\delta=(\alpha, \lambda, \zeta) \in \Delta$ of an architecture coding $\alpha \in A$, at least one hyperparameter of the training method $\lambda \in \Lambda$ and/or at least one of the further parameters $\zeta \in \Theta$.

In this exemplary embodiment, the same architecture search space as in DARTS (Liu et al., 2019) is to be used for the architecture coding $\alpha$. It should be noted that other architecture search spaces may also be used.

It should be noted that, in the case of DARTS, the normal cell and the reduction cell are each a directed graph having 2 input nodes $n_0$ and $n_i$ (which each receive the output variable of the preceding cell and the cell before that) and each having 4 intermediate nodes (which each add output variables of all preceding nodes to the cell element by element) and one output node (which link the outputs of all intermediate nodes). All input and intermediate nodes may be connected by directed edges, which represent mathematical operations. Each edge may have an operation set O, which includes the following operations:

3×3 convolution;

5×5 convolution;

3×3 dilated convolution;

5×5 dilated convolution;

3×3 max. pooling; and

3×3 mean value pooling.

The output performance of GIN 12 may be one of the following metrics or a combination of these metrics:

training/validation/test accuracy; and/or total runtime of the training in seconds; and/or number of model parameters of the machine learning system; and/or training/validation error or accuracy of the learning curve.

Figure 2:
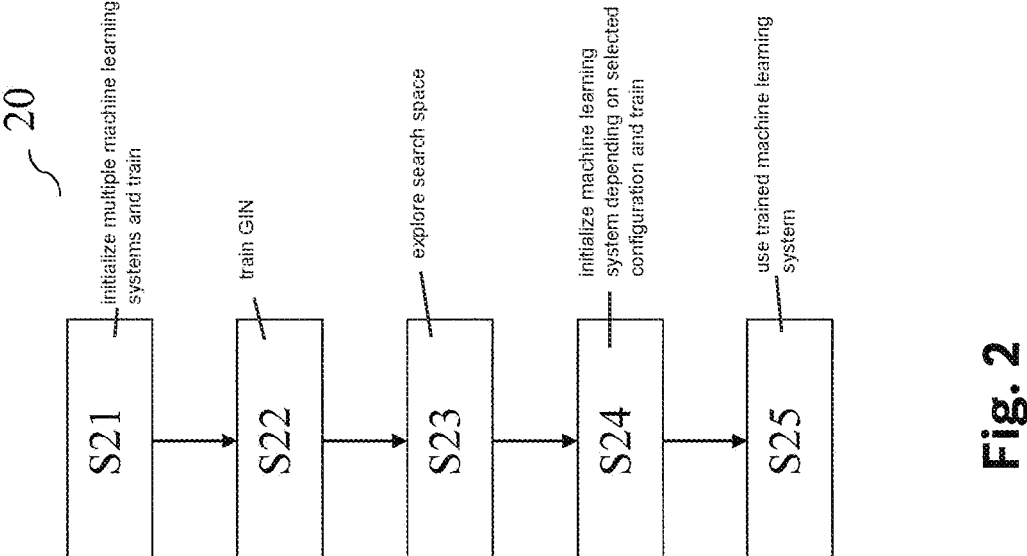
FIG. 2 shows a schematic representation of a flowchart, in accordance with an example embodiment of the present invention.

FIG. 2 shows an example of a flowchart of a method for predicting a suitable configuration of a machine learning system, using GIN 12.

The method begins with step S21. In this step, multiple machine learning systems are initialized with the aid of different configurations and subsequently trained on a first training data set. In step S21, the configurations used and training progressions or learning curves assigned in each case are subsequently combined into a second training data set. It is possible that a profile of a cost function, which was used to train the particular machine learning system, and/or a training time is/are stored additionally or alternatively to the training progressions. A learning curve may describe the convergence behavior of the training method.

In that a great variation in the values of the further parameter space $\Theta$ is permitted, the training time and the necessary resources for the training may vary greatly for different configurations. A balance is therefore preferably used between the evaluation of lower-end values of the further parameter space $\Theta$ for multiple architecture parameters A and the evaluation of "higher-end" parameters of the further parameter space $\Theta$ with fewer architecture parameters. This may be carried out as described below.

To derive a sample from the further parameter space $\Theta$, it is provided in one exemplary embodiment to select preferably 7 discrete points for each dimension of the further parameter space $\Theta$, which would result in 343 possible combinations from the number of training epochs e, start channels ch and stacked cells C. For example, the "lowest-end" combination from the further parameter space $\Theta$ may be initialized with min, $\zeta_{min}=(50; 8; 5)$.

To reach from a combination $\zeta_i$ from the further parameter space $\Theta$ to the next configuration $\zeta_{i+1}$, a fixed multiplication factor $\Theta=(\eta_{ch}; \eta_c; \eta_e)$ may be selected. Starting from $\zeta_{min}$, the next combination may then be obtained by $\zeta_{i+1}=$round $(\eta*\zeta_i)$, * being an element-by-element multiplication and $i \in \{0, 1, 2, \ldots, 6\}$.

To obtain a preferably efficient sample, for example 30,000 configurations may be randomly selected from the search space and evaluated.

A so-called successive halving method may be used, in which the selection of the configurations $\zeta_i$ is carried out in that the best values of the combination $\zeta_i$ are used, in part, for the next computational budget. The procedure is carried out until the configuration $\zeta_6$ is reached. This ensures that the time expended for the lowest and highest combinations $\zeta_i$ is approximately of the same length.

To study extreme cases and achieve a better coverage of the combinations, further configurations may be added: a predefinable number, e.g., 50, of configurations, which are randomly selected, two parameters being set to their lowest value, and the remaining parameters being varied only by the corresponding multiplier.

Preferably, the second training data set D, which includes the configuration, contains for example 50,000 data points $(\delta, \alpha_v, a_t, r))$ where $\delta \in \Delta$ and $\alpha_v$ are the validation/testing accuracy and r is the runtime of the particular configuration.

In subsequent step S22, GIN 12 is trained, using the second training data set D, so that GIN 12 may predict which performance the machine learning system may achieve, depending on a configuration of a machine learning system which has this configuration or was trained using this configuration.

After step S22 has been completed, step S23 may take place. In this step, the search space $\Delta$ is explored with the aid of GIN 12. Since the propagation of a configuration by GIN 12 is very time-efficient, even a very large number of different configurations may be quickly explored by GIN 12. During this exploration, the configuration is then output, which has generated, for example, the smallest or largest output variable of GIN 12.

In step S24, a machine learning system is then initialized, depending on the selected configuration from step S23, which may then be trained on the first training data set. It is possible here that a parameterization of one of the trained networks from step S21 is used as an initial parameterization of this machine learning system.

In subsequent step S25, the trained machine learning system from step S24 may be used, for example, in a control system, which is provided with sensor data via a sensor, the control system ascertaining a control variable, depending on the output variable of the trained machine learning system. The control variable may then be used to control an actuator.

Figure 3:
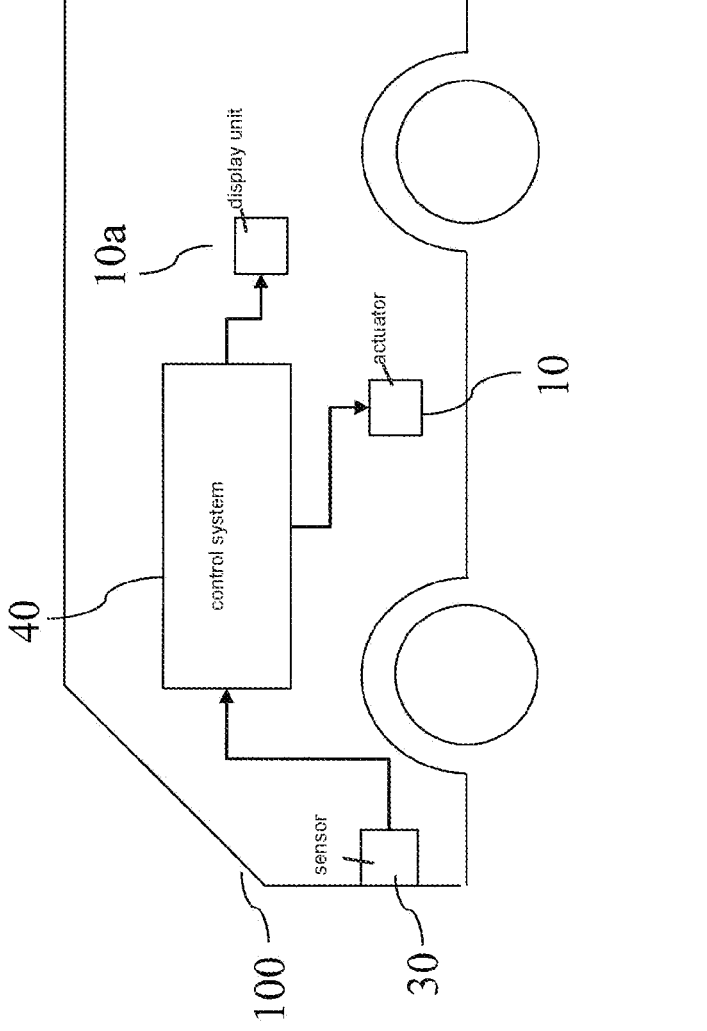
FIG. 3 shows a schematic exemplary embodiment for controlling an at least semi-autonomous robot, in accordance with an example embodiment of the present invention.

FIG. 3 shows how control system 40, which contains the trained machine learning system according to step S25, may be used to control an at least semi-autonomous robot, in this case an at least semi-autonomous motor vehicle 100.

Sensor 30 may be, for example, a video sensor, preferably situated in motor vehicle 100.

The trained machine learning system from step S24 may be an artificial neural network 60 for the exemplary embodiments below. This network 60 may be configured to reliably identify x objects from the input images.

Actuator 10, which is preferably situated in motor vehicle 100, may be, for example, a brake, a drive or a steering system of motor vehicle 100. Activation signal A may then be ascertained in such a way that actuator or actuators 10 are activated in such a way that motor vehicle 100 prevents, for example, a collision with the objects reliably identified with the aid of artificial neural network 60, in particular if they are objects of certain classes, e.g., pedestrians.

Alternatively, the at least semi-autonomous robot may also be another mobile robot (not illustrated), for example a robot which travels by flying, swimming, diving or walking. The mobile robot may also be, for example, an at least semi-autonomous lawnmower or an at least semi-autonomous cleaning robot. In these cases as well, activation signal A may be ascertained in such a way that the driving and/or steering of the mobile robot is activated in such a way that the at least semi-autonomous robot prevents, for example, a collision with objects identified by artificial neural network 60.

Alternatively or additionally, display unit 10a may be activated with the aid of activation signal A, and the ascertained secure areas may be shown. It is also possible, for example in a motor vehicle 100 including a non-automated steering system, that display unit 10a is activated with the aid of activation signal A in such a way that it outputs a visual or acoustic warning signal if it is ascertained that motor vehicle 100 is about to collide with the reliably identified objects.

Figure 4:
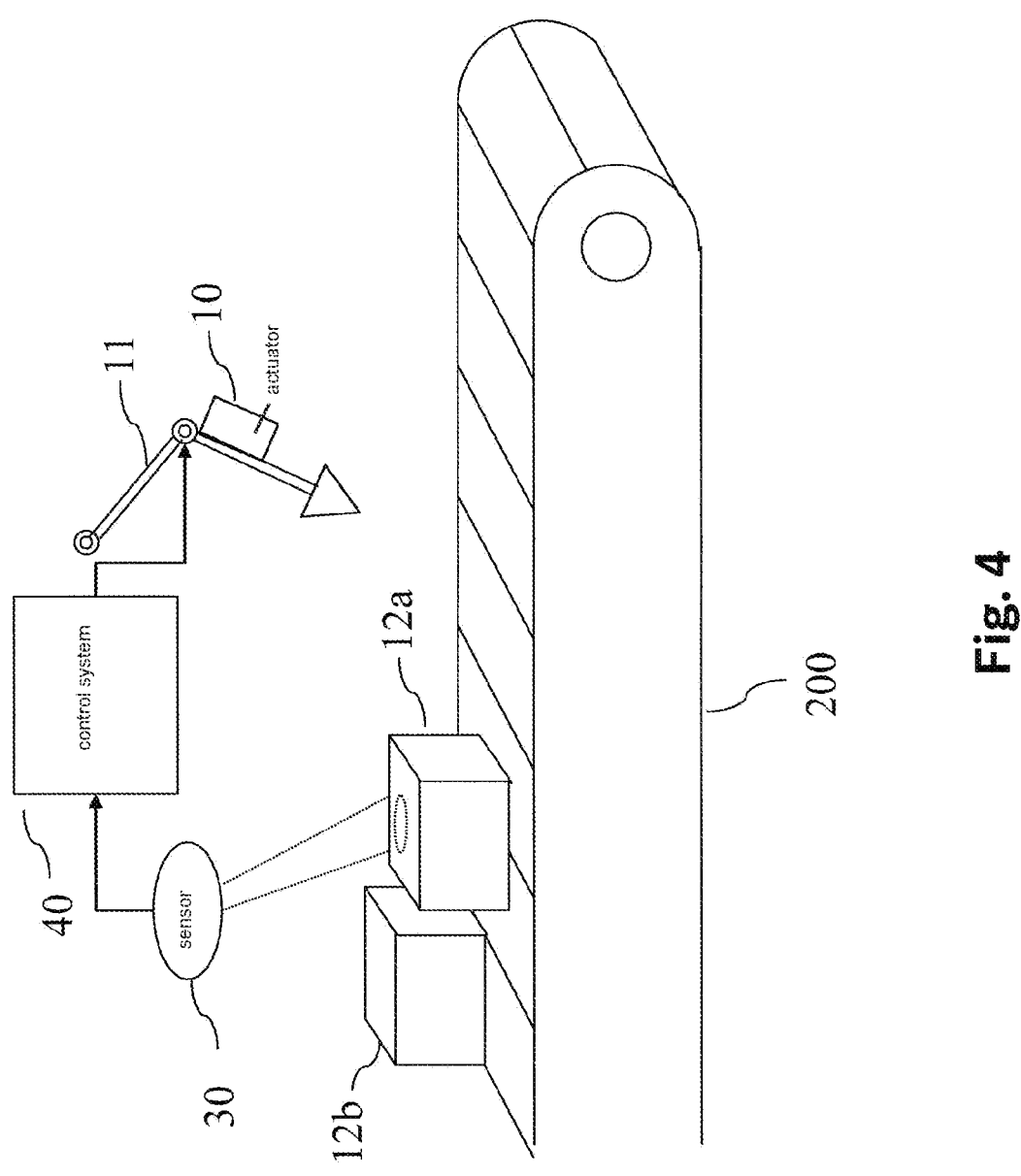
FIG. 4 shows a schematic exemplary embodiment for controlling a manufacturing system, in accordance with an example embodiment of the present invention.

FIG. 4 shows one exemplary embodiment, in which control system 40 is used to activate a manufacturing machine 11 of a manufacturing system 200, in that an actuator 10 controlling this manufacturing machine 11 is activated. Manufacturing machine 11 may be, for example, a machine for stamping, sawing, drilling and/or cutting.

Sensor 30 may then be, for example, an optical sensor, which detects, for example, properties of manufactured products 12a, 12b. It is possible that these manufactured products 12a, 12b are movable. It is possible that actuator 10 controlling manufacturing machine 11 is activated depending on an assignment of detected manufactured products 12a, 12b, so that manufacturing machine 11 correspondingly carries out a subsequent processing step of the right one of manufactured products 12a, 12b. It is also possible that, by identifying the right properties of the same one of manufactured products 12a, 12b) (e.g., without an erroneous assignment), manufacturing machine 11 adapts the same manufacturing step accordingly for processing a subsequent manufactured product.

Figure 5:
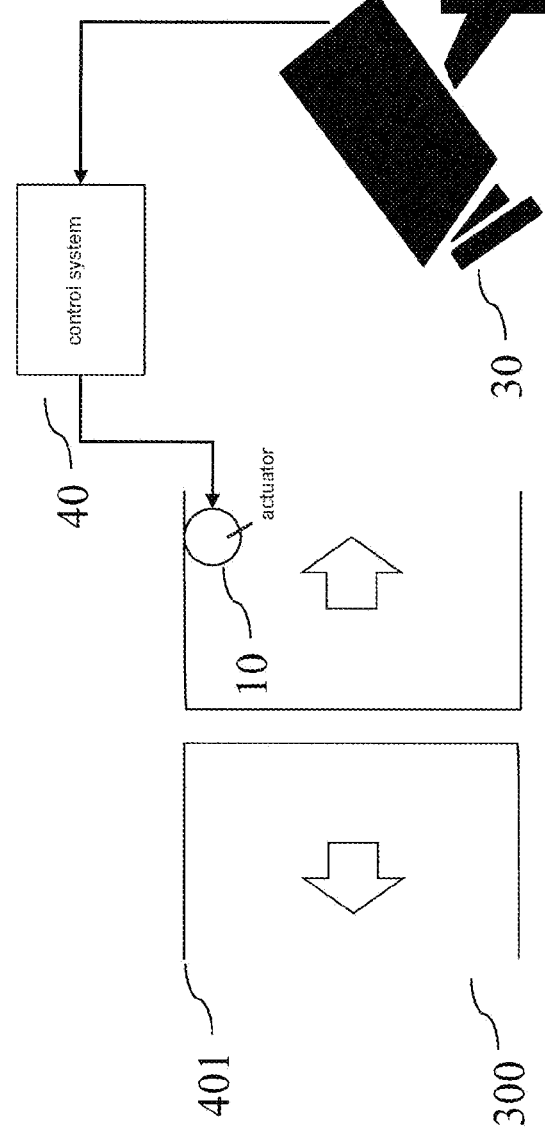
FIG. 5 shows a schematic exemplary embodiment for controlling an access system, in accordance with an example embodiment of the present invention.

FIG. 5 shows one exemplary embodiment, in which control system 40 is used to control an access system 300. Access system 300 may include a physical access control, for example a door 401. Video sensor 30 is configured to detect a person. This detected image may be interpreted with the aid of object identification system 60. If multiple people are detected at the same time, for example, the identity of the people may be particularly reliably ascertained by an assignment of the people (i.e., the objects) to each other, for example by analyzing their movements. Actuator 10 may be a lock, which releases or does not release the access control, depending on activation signal A, for example opens or does not open door 401. For this purpose, activation signal A may be selected, depending on the interpretation of object identification system 60, for example depending on the ascertained identity of the person. A logical access control may also be provided instead of the physical access control.

Figure 6:
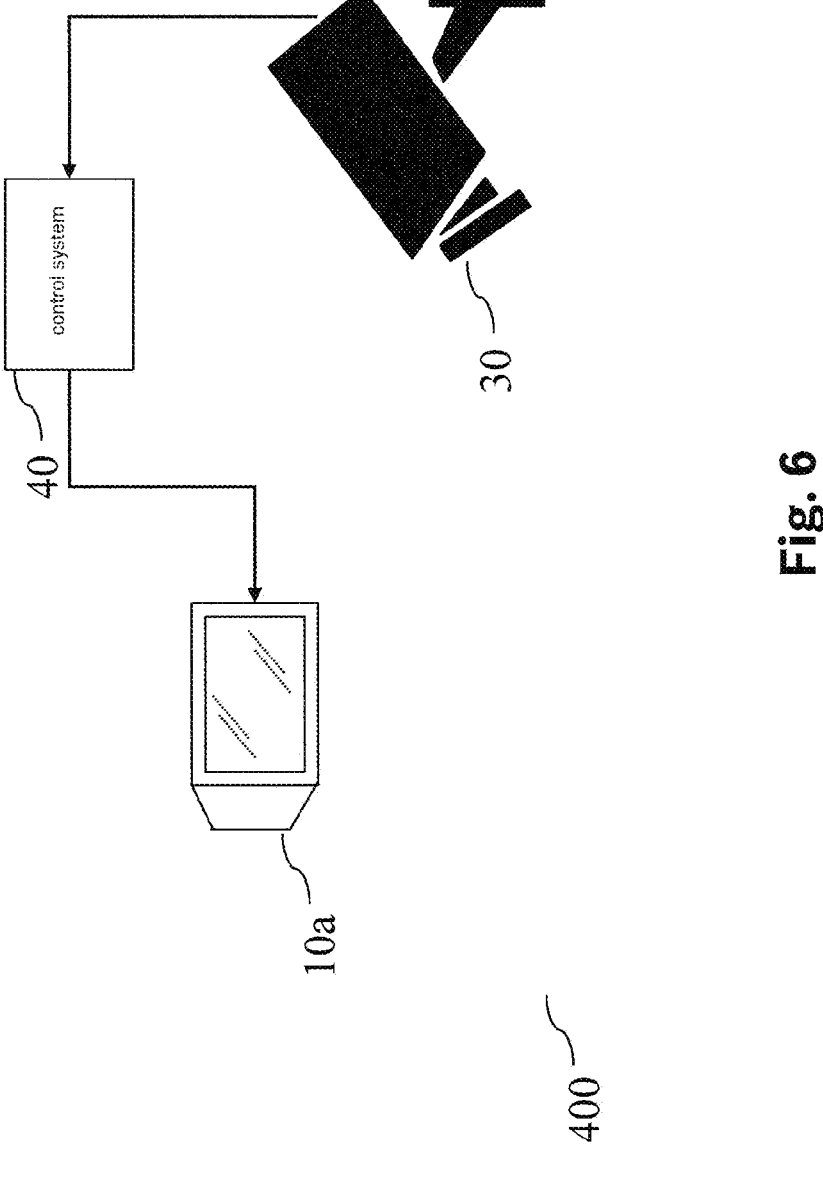
FIG. 6 shows a schematic exemplary embodiment for controlling a monitoring system, in accordance with an example embodiment of the present invention.

FIG. 6 shows one exemplary embodiment, in which control system 40 is used to control a monitoring system

400. This exemplary embodiment differs from the exemplary embodiment illustrated in FIG. 5 in that display unit 10a, which is activated by control system 40, is provided instead of actuator 10. For example, an identity of the objects recorded by video sensor 30 may be reliably ascertained by artificial neural network 60, for example to infer dependently thereon which of them are suspicious and to then select activation signal A in such a way that this object is shown with color highlighting by display unit 10a.

Figure 7:
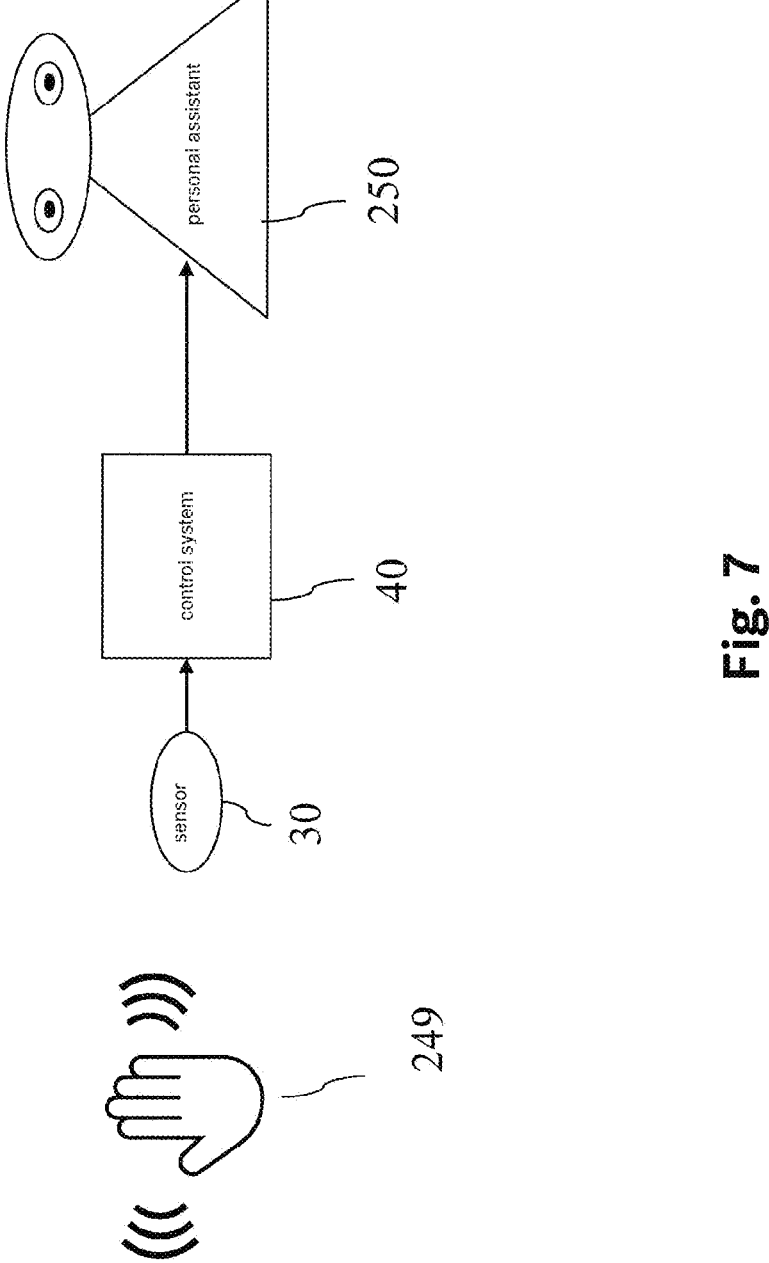
FIG. 7 shows a schematic exemplary embodiment for controlling a personal assistant, in accordance with an example embodiment of the present invention.

FIG. 7 shows one exemplary embodiment, in which control system 40 is used to control a personal assistant 250. Sensor 30 is preferably an optical sensor, which receives images of a gesture of a user 249.

Depending on the signals of sensor 30, control system 40 ascertains an activation signal A of personal assistant 250, for example in that the neural network carries out a gesture recognition. This ascertained activation signal A is then transmitted to personal assistant 250 and it is thus activated accordingly. This ascertained activation signal A may be selected, in particular, in such a way that it corresponds to an assumed desired activation by user 249. This assumed desired activation may be ascertained depending on the gesture recognized by artificial neural network 60. Control system 40 may then select activation signal A, depending on the assumed desired activation, for transmission to personal assistant 250, and/or it may select activation signal A for transmission to the personal assistant according to assumed desired activation 250.

This corresponding activation may involve, for example, the fact that personal assistant 250 retrieves information from a database and receptively reproduces it for user 249.

A household appliance (not illustrated), in particular a washing machine, a stove, an oven, a microwave or a dishwasher, may be provided instead of personal assistant 250 for the purpose of being correspondingly activated.

Figure 8:
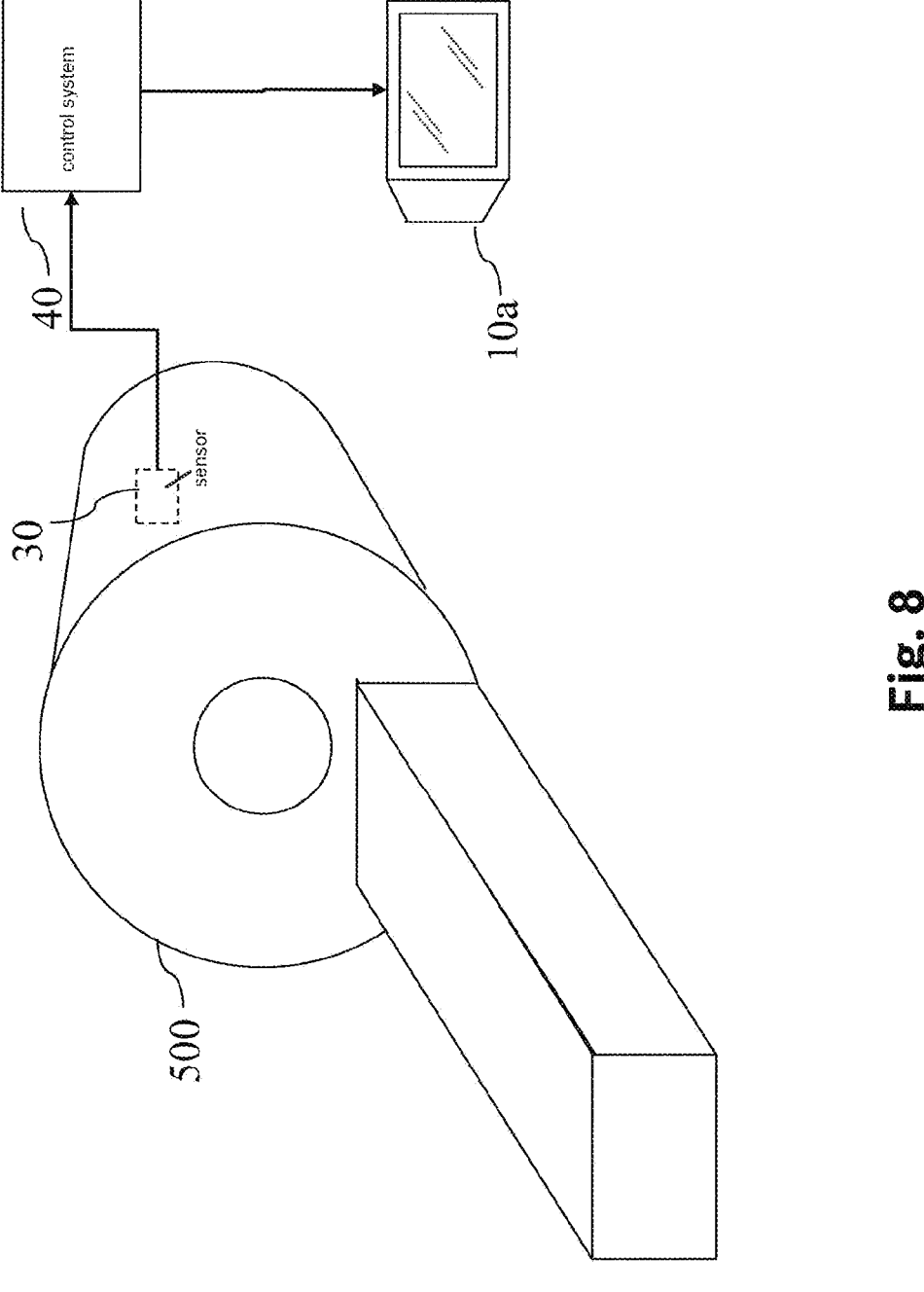
FIG. 8 shows a schematic exemplary embodiment for controlling a medical imaging system, in accordance with an example embodiment of the present invention.

FIG. 8 shows one exemplary embodiment, in which control system 40 is used to control a medical imaging system 500, for example, an MRI, X-ray or ultrasound machine. Sensor 30 may be, for example, in the form of an imaging sensor, display unit 10a being activated by control system 40. For example, it may be ascertained by neural network 60 whether an area recorded by the imaging sensor is abnormal, and activation signal A may then be selected in such a way that this area is illustrated with color highlighting by display unit 10a.

Figure 9:
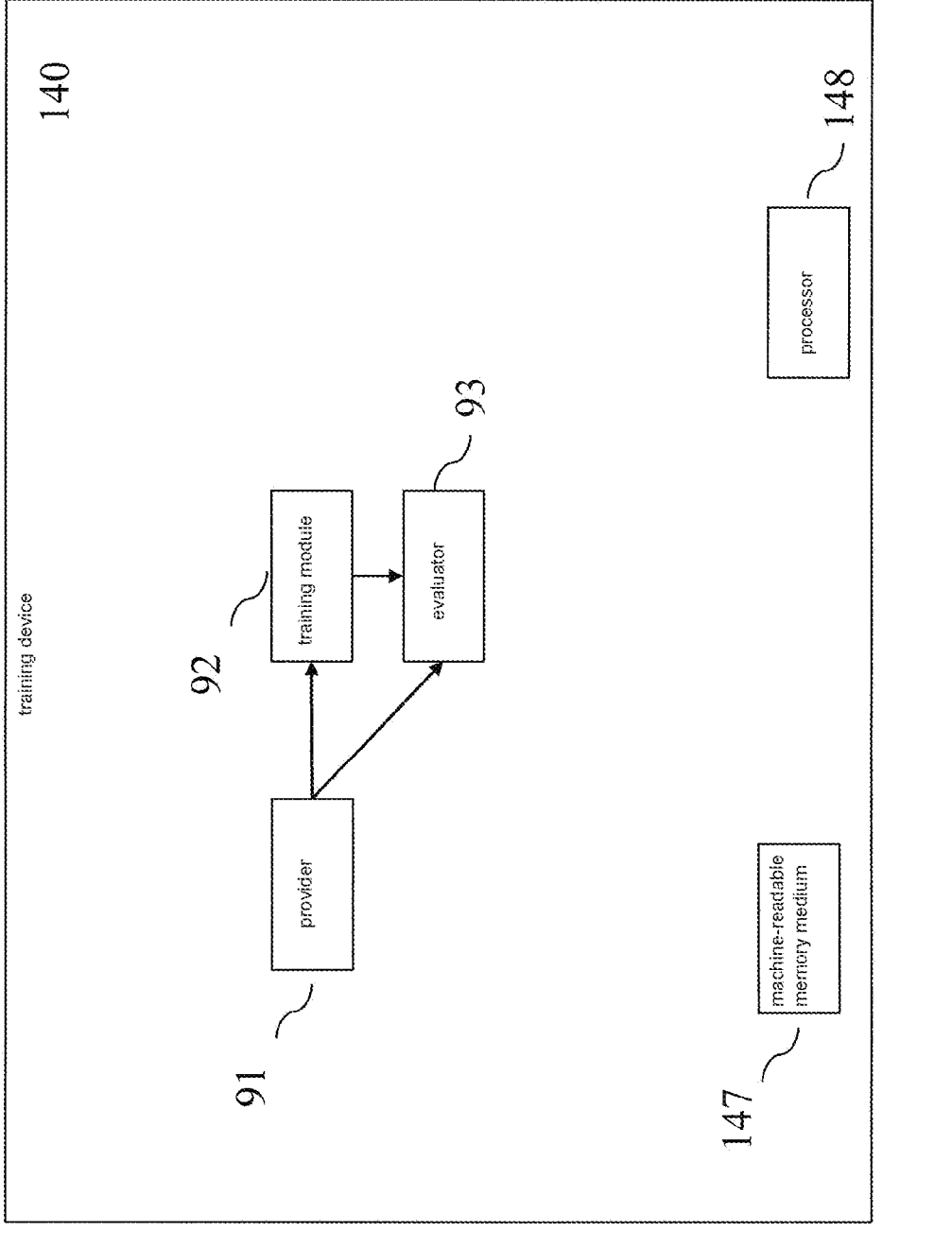
FIG. 9 shows a possible design of a second training device, in accordance with an example embodiment of the present invention.

FIG. 9 shows a training device 140, which includes a provider 91, which provides input variables and associated labels from a training data set. Input variables are supplied to training module 92, which ascertains output variables a herefrom. Output variables a and associated labels are supplied to an evaluator 93, which ascertains parameters θ' herefrom via the training method, which are transmitted to parameter memory P, where they replace parameters θ, which belong to the instantaneous parameters of the training module.

The methods carried out by training device 141 may be implemented as a computer program on a machine-readable memory medium 147 and carried out by a processor 148.

What is claimed is:

1. A method for predicting a suitable configuration of a machine learning system and/or a training method, for a first training data set, comprising the following steps, which are carried out on a computer:

training a plurality of machine learning systems using the first training data set, the machine learning systems and/or training methods used for the training being configured differently;

creating a second training data set which includes ascertained respective performance capabilities of the trained machine learning systems on the first training data set and respective assigned configurations;

training a graph isomorphism network, depending on the second training data set, so that the graph isomorphism network ascertains the respective performance capabilities, depending on the respective assigned configurations;

predicting performance capabilities for a provided plurality of configurations using the graph isomorphism network; and selecting a configuration from the provided plurality for configurations for which a best performance capability was predicted, wherein:

a further machine learning system is initialized, depending on the selected configuration, the further machine learning system being trained, and the trained, further machine learning system being used to ascertain a control variable for an actuator, each of the respective assigned configurations includes at least one parameter which characterizes a structure of the respective machine learning system, the structure being defined using DARTS cells, the parameters which characterize the structure of the machine learning systems and different DARTS cells are grouped into disjoint graphs for the second training data set, where further parameters of the configurations, which characterize a predefinable number of total stacked cells and/or a predefinable number of training epochs, are concatenated for each DARTS cell of the machine learning system, and a predefinable set of values for different versions of the further parameters of the configurations are provided in each case, the machine learning systems first being trained using configurations which include the further parameters, starting with lowest values from the predefinable set of values in each case, further configurations then being selected from the predefinable set of values, depending on a predefinable computational budget, and the machine learning systems being trained using the selected further configurations, depending on the computational budget.

2. The method as recited in claim 1 wherein the different DART cells include a normal cell and a reduction cell.

3. The method as recited in claim 1, wherein the further configurations are ascertained using a successive halving method, depending on the predefinable computational budget, until highest values of the predefinable set of values of the further parameters have been reached.

4. The method as recited in claim 1 wherein, during the training, multiple different further configurations are randomly used in addition for the selected, lowest values of the predefinable set of values.

5. A method for predicting a suitable configuration of a machine learning system and/or a training method, for a first training data set, comprising the following steps, which are carried out on a computer:

training a plurality of machine learning systems using the first training data set, the machine learning systems and/or training methods used for the training being configured differently;

creating a second training data set which includes ascertained respective performance capabilities of the trained machine learning systems on the first training data set and respective assigned configurations;

training a differentiable graph pooling network (DiffPool) or XGBoost or LGBoost, depending on the second training data set, so that the DiffPool or XGBoost or LGBoost ascertains the respective performance capabilities, depending on the respective assigned configurations;

predicting performance capabilities for a provided plurality of configurations using the DiffPool or XGBoost or LGBoost; and selecting a configuration from the plurality for configurations for which a best performance capability was predicted, wherein;

a further machine learning system is initialized, depending on the selected configuration, the further machine learning system being trained, and the trained, further machine learning system being used to ascertain a control variable for an actuator, each of the respective assigned configurations includes at least one parameter which characterizes a structure of the respective machine learning system, the structure being defined using DARTS cells, the parameters which characterize the structure of the machine learning systems and different DARTS cells are grouped into disjoint graphs for the second training data set, where further parameters of the configurations, which characterize a predefinable number of total stacked cells and/or a predefinable number of training epochs, are concatenated for each DARTS cell of the machine learning system, and a predefinable set of values for different versions of the further parameters of the configurations are provided in each case, the machine learning systems first being trained using configurations which include the further parameters, starting with lowest values from the predefinable set of values in each case, further configurations then being selected from the predefinable set of values, depending on a predefinable computational budget, and the machine learning systems being trained using the selected further configurations, depending on the computational budget.

6. A non-transitory machine-readable memory element on which is stored a computer program for predicting a suitable configuration of a machine learning system and/or a training method, for a first training data set, the computer program, when executed by a computer, causing the computer to perform the following steps:

training a plurality of machine learning systems using the first training data set, the machine learning systems and/or training methods used for the training being configured differently;

creating a second training data set which includes ascertained respective performance capabilities of the trained machine learning systems on the first training data set and respective assigned configurations;

training a graph isomorphism network, depending on the second training data set, so that the graph isomorphism network ascertains the respective performance capabilities, depending on the respective assigned configurations;

predicting performance capabilities for a provided plurality of configurations using the graph isomorphism network; and selecting a configuration from the provided plurality for configurations for which a best performance capability was predicted, wherein:

a further machine learning system is initialized, depending on the selected configuration, the further machine learning system being trained, and the trained, further machine learning system being used to ascertain a control variable for an actuator, each of the respective assigned configurations includes at least one parameter which characterizes a structure of the respective machine learning system, the structure being defined using DARTS cells, the parameters which characterize the structure of the machine learning systems and different DARTS cells are grouped into disjoint graphs for the second training data set, where further parameters of the configurations, which characterize a predefinable number of total stacked cells and/or a predefinable number of training epochs, are concatenated for each DARTS cell of the machine learning system, and a predefinable set of values for different versions of the further parameters of the configurations are provided in each case, the machine learning systems first being trained using configurations which include the further parameters, starting with lowest values from the predefinable set of values in each case, further configurations then being selected from the predefinable set of values, depending on a predefinable computational budget, and the machine learning systems being trained using the selected further configurations, depending on the computational budget.

7. A device configured to predict a suitable configuration of a machine learning system and/or a training method, for a first training data set, the device configured to:

train a plurality of machine learning systems using the first training data set, the machine learning systems and/or training methods used for the training being configured differently;

create a second training data set which includes ascertained respective performance capabilities of the trained machine learning systems on the first training data set and respective assigned configurations;

train a graph isomorphism network, depending on the second training data set, so that the graph isomorphism network ascertains the respective performance capabilities, depending on the respective assigned configurations;

predict performance capabilities for a provided plurality of configurations using the graph isomorphism network; and select a configuration from the provided plurality for configurations for which a best performance capability was predicted, wherein:

a further machine learning system is initialized, depending on the selected configuration, the further machine learning system being trained, and the trained, further machine learning system being used to ascertain a control variable for an actuator, each of the respective assigned configurations includes at least one parameter which characterizes a structure of the respective machine learning system, the structure being defined using DARTS cells, the parameters which characterize the structure of the machine learning systems and different DARTS cells are grouped into disjoint graphs for the second training data set, where further parameters of the configurations, which characterize a predefinable number of total stacked cells and/or a predefinable number of training epochs, are concatenated for each DARTS cell of the machine learning system, and a predefinable set of values for different versions of the further parameters of the configurations are provided in each case, the machine learning systems first being trained using configurations which include the further parameters, starting with lowest values from the predefinable set of values in each case, further configurations then being selected from the predefinable set of values, depending on a predefinable computational budget, and the machine learning systems being trained using the selected further configurations, depending on the computational budget.

* * * * *